US007680507B2

(12) United States Patent
Cheng et al.

(10) Patent No.: US 7,680,507 B2
(45) Date of Patent: Mar. 16, 2010

(54) SHARED CONTROL AND SIGNALING CHANNEL FOR USERS SUBSCRIBING TO DATA SERVICES IN A COMMUNICATION SYSTEM

(75) Inventors: Fang-Chen Cheng, Randolph, NJ (US); Jung-Tao Liu, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 384 days.

(21) Appl. No.: 10/286,946

(22) Filed: Nov. 4, 2002

(65) Prior Publication Data

US 2004/0087325 A1 May 6, 2004

(51) Int. Cl.
*H04B 7/00* (2006.01)
*H04Q 7/20* (2006.01)

(52) U.S. Cl. .................... 455/522; 455/69; 455/517; 455/515

(58) Field of Classification Search .................. 455/69, 455/522, 515, 516, 517, 446, 450, 452.1, 455/455, 464, 509, 511, 414.4, 67.3, 67.11, 455/59, 68; 370/218, 329, 352, 334, 337
See application file for complete search history.

(56) References Cited

U.S. PATENT DOCUMENTS

| 6,650,905 | B1 * | 11/2003 | Toskala et al. ............. 455/522 |
| 6,775,254 | B1 * | 8/2004 | Willenegger et al. ........ 370/329 |
| 6,879,831 | B2 * | 4/2005 | Hamabe ..................... 455/442 |
| 6,963,540 | B2 * | 11/2005 | Choi et al. .................. 370/252 |
| 6,970,438 | B2 * | 11/2005 | Mate et al. .................. 370/329 |
| 7,130,588 | B2 * | 10/2006 | Niwano .................... 455/67.11 |
| 2002/0077141 | A1 * | 6/2002 | Hwang et al. ............... 455/522 |
| 2002/0141331 | A1 * | 10/2002 | Mate et al. .................. 370/218 |
| 2003/0076799 | A1 * | 4/2003 | Kwak et al. ................. 370/335 |
| 2003/0086389 | A1 * | 5/2003 | Hayashi et al. ............. 370/328 |
| 2003/0119452 | A1 * | 6/2003 | Kim et al. .................... 455/69 |
| 2003/0123396 | A1 * | 7/2003 | Seo et al. .................... 455/67.3 |
| 2004/0224692 | A1 * | 11/2004 | Hamabe .................... 455/442 |
| 2005/0208961 | A1 * | 9/2005 | Willenegger ................ 455/522 |
| 2008/0045261 | A1 * | 2/2008 | Tsunehara et al. .......... 455/522 |

OTHER PUBLICATIONS

"TDM method among UEs within one code." 3GPP TSG-RAN1 Meeting #22, Jeju, Korea, Nov. 9-13, 200, pp. 1-3.
"Code limitation and code reuse in HSDPA." 3GPP TSG-RAN, Espoo, Finland, Oct. 8-9, 2002, pp. 1-10.
"HSDPA-UE capability, SF=512." 3GPP TSG-RAN WG2 meeting #29, GyeongJu, Korea, May 13-17, 2002, pp. 1-2.
"Support for SF=512 DPCH in Release-5." 3GPP TSG-RAN1 #27, Oulu, Finland, Jul. 2-5, 2002, pp. 1-2.
"Code Limitation and Introduction of SF=256 for AMR 7.95 kbps-5.9 kbps." 3GPP TSG-RAN WG1 #28 meeting, Seattle, USA, Aug. 19-22, 2002.
"Code Limitation and Introduction of SF-256 case for AMR 7.95 kbps-5.9 kbps." (Change Request) 3GPP TSG-RAN1 Meeting #28, Seattle, USA, Aug. 19-22, 2002, pp. 1-13.

* cited by examiner

*Primary Examiner*—John Lee
(74) *Attorney, Agent, or Firm*—Harness, Dickey & Pierce

(57) ABSTRACT

The downlink shared channel includes dedicated physical channel control information for more than one mobile. In HSDPA, providing the downlink shared channel replaces the downlink dedicated physical channels for at least two mobiles.

14 Claims, 1 Drawing Sheet

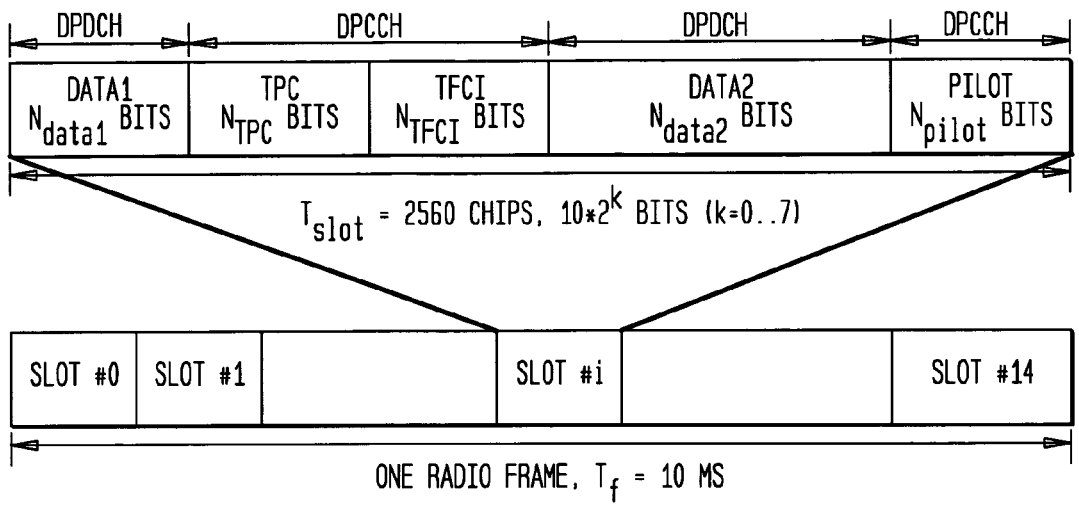
FIG. 1
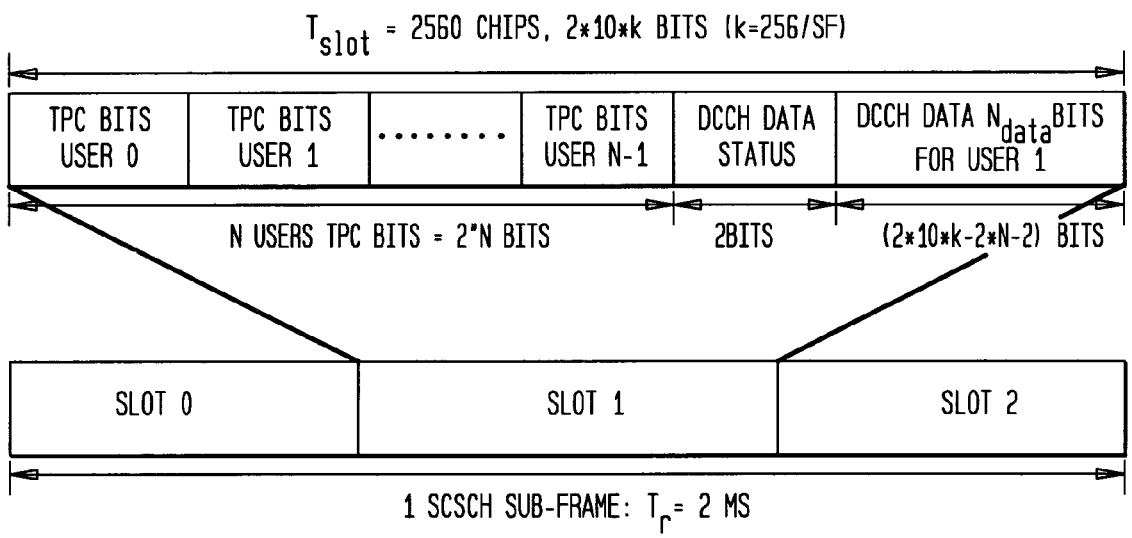
FIG. 2
FIG. 3
| DCCH DATA STATUS FIELD | INDICATION OF DCCH DATA STATUS |
|---|---|
| 11 | BEGINNING OF A DCCH DATA |
| 10 | MIDDLE OF DCCH DATA |
| 01 | END OF DCCH DATA |
| 00 | NO DCCH DATA |

SHARED CONTROL AND SIGNALING CHANNEL FOR USERS SUBSCRIBING TO DATA SERVICES IN A COMMUNICATION SYSTEM

BACKGROUND OF THE INVENTION

Wireless third generation (3G) communications systems are currently introducing technologies in order to become spectrally efficient and provide improved support for data services. These efforts have resulted in the development of the 3G1x-EVDV standard, an evolution of CDMA2000 from the 3GPP body of standards. Similarly, the universal mobile telecommunications system (UMTS) standard has introduced several advanced technologies as part of the high-speed downlink packet access (HSDPA) specification. An aspect in all of these technologies is to ensure any associated control information is carried in an efficient manner.

Currently in the HSDPA standard, every mobile communicating voice and/or data has a dedicated control and signaling channel established between the base station and the mobile on the downlink. This channel is referred to as the dedicated physical channel (DPCH) in the standard. FIG. 1 illustrates the frame structure for the downlink DPCH. As shown in FIG. 1, the downlink DPCH includes portions of a dedicated physical control channel (DPCCH) and a dedicated physical data channel (DPDCH). Specifically, the downlink DPCH for a user includes the downlink transmit power control (TPC) information, the transport format combination indicator (TFCI) information, and the pilot field of the DPCCH. With respect to the DPDCH, the downlink DPCH includes the voice data and higher layer signaling data. However, as will be appreciated, if a mobile user is only involved in data communication, and no voice communication, then the DPDCH fields in the downlink DPCH are mostly empty except for the higher layer signaling data called the dedicated transport channel (DCCH).

As discussed above, the downlink DPCH is a dedicated channel for the mobile user. Accordingly, each user involved in voice and/or data communication has a corresponding downlink DPCH assigned, and each assigned DPCH requires the use of a channelization code for transmission. However, the base station only has a limited number of channelization codes to devote to establishing downlink DPCHs. Consequently, as the demand for data services increases, and more users of the system conduct strictly data communication, an insufficient number of channelization codes will be available to handle the data communication.

SUMMARY OF THE INVENTION

The shared channel according to the present invention permits the use of a single channel to provide n users with the information normally provided over n dedicated channels, where n is an integer greater than 1. Accordingly, the present invention permits replacing those n dedicated channels with a single channel such that a significant reduction in the use of channelization codes is achieved.

With respect to the embodiment of the present invention for HSDPA, the shared channel is configured as a shared control and signaling channel (SCSCH) that takes the place of n DPCHs. A slot of the SCSCH includes the TPC information of n users multiplexed together. Each slot also includes the signaling information normally in a user's DPCCH, and the signaling information normally in the DPCCH for multiple users is multiplexed over different slots of the SCSCH.

BRIEF DESCRIPTION OF THE DRAWINGS

The present invention will become more fully understood from the detailed description given below and the accompanying drawings, wherein like elements are represented by like reference numerals, which are given by way of illustration only and thus are not limitative of the present invention and wherein:

FIG. 1 illustrates the frame structure of a downlink dedicated physical channel according to the HSDPA standard;

FIG. 2 illustrates the sub-frame structure of the shared control and signaling channel according to an embodiment of the present invention; and FIG. 3 illustrates the possible DCCH data status field indications for the DCCH data status field of the SCSCH illustrated in FIG. 2.

DETAILED DESCRIPTION OF THE PRESENT INVENTION

According to the methodology of the present invention, a downlink shared control and signaling channel (SCSCH) is established for a number n (wherein n is an integer greater than 1) of mobile users performing only data communication. The SCSCH eliminates the need for, for example, a DPCH for each of those mobile users, and thus reduces the use of the limited number of channelization codes available.

FIG. 2 illustrates one embodiment of a downlink SCSCH according to the present invention for use in HSDPA. As shown, the downlink SCSCH sub-frame includes three slots and the frame length is two milliseconds. In one possible implementation, the downlink SCSCH is aligned with the high-speed physical downlink shared channel (HS-PDSCH) in HSDPA. In one other possible implementation, the downlink SCSCH is aligned with the high speed shared control channel (HS-SCCH). Each slot of the downlink SCSCH includes a TPC part, a dedicated transport control channel (DCCH) data status part, and a DCCH data part. The TPC part includes the TPC bits for the n mobile users; the TPC bits of each mobile normally being in the downlink DPCH of each mobile user. Stated another way, the TPC information of the n mobile users is multiplexed onto the SCSCH. The location of the TPC bits for a specific mobile user in a slot is assigned in the call setup procedure according to well known methodologies. Furthermore, a change in the location of the TPC bits for a user within a slot can easily be achieved by reconfiguration through higher layer signaling as is known in the art. Similarly, the spreading factor of the channelization code used for the SCSCH is assigned also in the call setup procedure. The spreading factor of the channelization code used for the SCSCH can be changed by reconfiguration through higher layer signaling. A system can have more than one SCSCH in the downlink of a given frequency carrier.

FIG. 3 illustrates the possible DCCH data status field indications of the downlink SCSCH. As shown, the DCCH data status field is a two-bit field indicating whether the DCCH data part of the slot in the downlink SCSCH includes DCCH data and what portion of the DCCH data is included in the DCCH data part if DCCH data is present in the DCCH data part. Because of the relative size of the DCCH data part of a slot to the amount of DCCH data normally in the DPDCH portions of a downlink DPCH, the entire amount of DCCH data may not fit within the DCCH data part of a slot in the SCSCH. Accordingly, the DCCH data for a user must be sent over more than one slot. The DCCH data status field indicates whether the DCCH data in the DCCH data part for the user is the beginning, middle or end of the DCCH data for that user.

While the SCSCH includes the TPC bits for the n users, the DCCH data in a slot of the SCSCH only includes DCCH data for one of the n users. However, the DCCH data part in different slots can carry DCCH data for different users. Namely, the DCCH data part in the slots of the SCSCH are shared by the n users on a slot-by-slot basis (i.e., the DCCH data of the n users is multiplexed into different slots). The issue then becomes how to schedule the DCCH data for the n users into the slots of the SCSCH. In this embodiment of the invention, the scheduling is the same as that done for the HS-PDSCH. The HS-PDSCH is a shared channel for which scheduling of the data for n users into slots of the HS-PDSCH is well known and performed during communication with those n users. Accordingly, how ever a mobile user is scheduled with respect to the slots in the HS-PDSCH, the same scheduling is used for the slots of the SCSCH. Remember, as discussed above, in one of the possible implementations, the SCSCH is aligned with the HS-PDSCH in order to permit this use of the scheduling of the HS-PDSCH for the SCSCH. Furthermore, as is known, a mobile user determines which slot data has been scheduled for that user in the HS-PDSCH based on information in the HS-SCCH. Accordingly, this same information indicates to the mobile user when data for that mobile user has been scheduled in the DCCH data part of a slot in the SCSCH.

Because the indication of the mobile user information of the DCCH data is conducted through the HS-SCCH and the status of the DCCH data is indicated through the DCCH data status part, supplying each of the n users with the TFCI information normally sent in the DPCH is no longer necessary.

As will be appreciated from the above description. The information in the DPDCH of the DPCHs for n users is included in the SCSCH when those users are strictly data users. Because the users are strictly data users, no voice data is in the DPDCH. With respect to the DPCCH, all of the information except for the pilot bits for the n users is either in the SCSCH or has been rendered unnecessary. In using the SCSCH according to the present invention as shown in FIG. 2, the dedicated pilot field of a DPCH is not supported. Because the SCSCH is a common channel, downlink inner loop power control is not required. Thus, the dedicated pilot field is not necessary.

The SCSCH according to the present invention provides for a significant reduction in the number of channelization codes necessary for performing data communication. Instead of having n downlink DPCH for the data communication of n users, only a single SCSCH according to the present invention is needed. Thus, a savings of n-1 channelization codes is achieved. By utilizing multiple SCSCHs, for multiple groups of mobile users, an even greater savings in the use of channelization codes is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method, comprising:
providing a downlink shared channel shared by a plurality of mobiles and having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

2. The method of claim 1, wherein a given slot of the downlink shared channel includes dedicated physical channel signaling information for only one mobile.

3. The method of claim 1, wherein the plurality of mobiles are not communicating voice information.

4. The method of claim 1, wherein the downlink dedicated physical channels do not include voice data.

5. The method of claim 1, wherein the power control part in each slot is composed of separate power control bits for each of a plurality of mobiles, the data part carries data for one of the plurality of mobiles.

6. The method of claim 5, wherein the subframes do not include a dedicated pilot field.

7. A method, comprising:
replacing at least two downlink dedicated physical channels with one downlink shared channel shared by a plurality of mobiles and having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

8. The method of claim 7, wherein the power control part of the downlink shared channel includes power control information of the at least two downlink dedicated channels.

9. The method of claim 7, wherein the downlink shared channel includes signaling information of more than one of the downlink dedicated physical channels.

10. The method of claim 9, wherein a given slot of the downlink shared channel includes the signaling information of only one downlink dedicated physical channel.

11. A method, comprising:
multiplexing a downlink shared control shared by a plurality of mobiles and having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

12. A method for reducing use of channelization codes in a high speed data packet access communication system, comprising:
providing a downlink shared control shared by a plurality of mobiles and a signaling channel having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

13. A method, comprising:
transmitting a downlink shared channel shared by a plurality of mobiles and having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

14. A method, comprising:
receiving, at a mobile station, at least a portion of a downlink shared channel shared by a plurality of mobiles and having a plurality of subframes, each subframe comprising a plurality of slots, each slot including a power control part composed of power control bits for the plurality of mobiles, a data status part and a data part; wherein the data status part is indicative of whether data in the data part is a beginning, middle or end of data for one of the plurality of mobiles.

* * * * *